US010262056B2

United States Patent
Hampp-Bahnmueller et al.

(10) Patent No.: US 10,262,056 B2
(45) Date of Patent: Apr. 16, 2019

(54) METHOD AND SYSTEM FOR PERFORMING SEARCH QUERIES USING AND BUILDING A BLOCK-LEVEL INDEX

(71) Applicant: International Business Machines Corporation, Armonk, NY (US)

(72) Inventors: Thomas A. Hampp-Bahnmueller, Stuttgart (DE); Peng H. Jiang, Beijing (CN); Pi J. Jiang, Beijing (CN); Yan U. Xu, Beijing (CN)

(73) Assignee: International Business Machines Corporation, Armonk, NY (US)

( * ) Notice: Subject to any disclaimer, the term of this patent is extended or adjusted under 35 U.S.C. 154(b) by 384 days.

(21) Appl. No.: 14/555,828

(22) Filed: Nov. 28, 2014

(65) Prior Publication Data

US 2015/0154253 A1    Jun. 4, 2015

(30) Foreign Application Priority Data

Dec. 3, 2013    (GB) .................... 1321286.5

(51) Int. Cl.
*G06F 17/30*    (2006.01)

(52) U.S. Cl.
CPC .............................. *G06F 17/30619* (2013.01)

(58) Field of Classification Search
CPC ............ G06F 17/30; G06F 17/30619; G06F 17/30067; G06F 17/00
USPC ................................................. 707/600–899
See application file for complete search history.

(56) References Cited

U.S. PATENT DOCUMENTS

| | | | |
|---|---|---|---|
| 8,140,537 B2 | 3/2012 | Elrom et al. | |
| 8,214,359 B1 | 7/2012 | Gomes et al. | |
| 8,311,964 B1 | 11/2012 | Efstathopoulos et al. | |
| 2006/0047732 A1 | 3/2006 | Kudo | |
| 2006/0248039 A1 | 11/2006 | Brooks et al. | |
| 2008/0263032 A1 | 10/2008 | Vailaya et al. | |
| 2010/0114878 A1* | 5/2010 | Lu ..................... | G06F 17/30675 707/723 |

(Continued)

FOREIGN PATENT DOCUMENTS

| | | |
|---|---|---|
| CN | 101526956 A | 9/2009 |
| EP | 0886227 A1 | 12/1998 |

(Continued)

OTHER PUBLICATIONS

Cadenhead et al.; Improving Web Information Indexing and Retrieval Based on the Centre Block Duplication Detection, International Journal of Innovative Computing, vol. 1, No. 3, 2008. 1-12.

*Primary Examiner* — Isaac M Woo
(74) *Attorney, Agent, or Firm* — Mollborn Patents, Inc.; Fredrik Mollborn

(57) ABSTRACT

A method and a computer-readable medium for method for searching a plurality of documents. Each document is structured into a set of blocks and each block is associated with a block ID. The method includes receiving a search query including a search term having at least one search term attribute; identifying at least one block ID based on a correlation between the at least one search term attribute and the set of blocks; and identifying at least one document based on a correlation between the set of blocks and the documents. Methods for generating a data structure for searching documents are also described.

14 Claims, 9 Drawing Sheets

(56) References Cited

U.S. PATENT DOCUMENTS

| | | |
|---|---|---|
| 2010/0287177 A1 | 11/2010 | Resnick et al. |
| 2011/0302166 A1 | 12/2011 | Moriya et al. |
| 2012/0179709 A1* | 7/2012 | Nakano .............. G06F 17/3061 |
| | | 707/769 |
| 2015/0066976 A1* | 3/2015 | Dahl ................ G06F 17/30619 |
| | | 707/769 |

FOREIGN PATENT DOCUMENTS

| | | |
|---|---|---|
| EP | 2278498 B1 | 10/2016 |
| JP | H08272822 A | 10/1996 |
| JP | 2005525659 A | 8/2005 |
| JP | 2008140085 A | 6/2008 |
| WO | 2010128967 A1 | 11/2010 |

\* cited by examiner

| 600a → | 610a ↓ Document ID | 620a ↓ Block name | 630a ↓ Support information (e.g. block hash) |
|---|---|---|---|
| | D1 | B1, B2, B3 | (hash(B1)); (hash(B2); (hash(B3)) |
| | D2 | B1, B2, B3 | (hash(B1)); (hash(B2); (hash(B3)) |
| | D3 | B1, B2, B3 | (hash(B1)); (hash(B2); (hash(B3)) |
| | . | . | . |
| | . | . | . |
| | . | . | . |

| 600b → Block name | Document ID | Support information (e.g. block hash) |
|---|---|---|
| B1 | D1 | ... |
| B2 | D1, D2, D3 | ... |
| B3 | D1, D2 | ... |
| B4 | D2, D3 | ... |
| B5 | D3 | ... |
| . | . | . |
| . | . | . |
| . | . | . |

METHOD AND SYSTEM FOR PERFORMING SEARCH QUERIES USING AND BUILDING A BLOCK-LEVEL INDEX

BACKGROUND

The present invention relates generally to the field of searching documents. More specifically, the present invention is related to a method for performing search queries on a document level based on block-level indexes.

It often happens that multiple documents comprise sections, portions or components with identical content. For example, one email is replied or forwarded many times, and all replied or forwarded emails contain the originally sent email. The same case happens in the post from social media, e.g. wiki, blog etc. In compound documents such as email with attachments or ZIP files whole sub-documents (e.g. the attachments or files in a ZIP) may be shared by many different top-level documents (e.g. different emails or ZIP files).

When indexing multiple documents comprising portions of identical content, specifically full text indexing, the duplicated portions of content will be indexed multiple times leading to redundant information within the index and an large size of the index.

A technology providing non-redundant index representation for duplicated sections in documents would be really helpful because computing capability wasted to reanalyze and index identical sections as well as repository i.e. any kind of persistent storage, e.g. hard disk for storing the index can be saved. On the other hand, the technology has to provide means for searching documents as usual on a document level and not on a block level, i.e. oriented towards search and retrieval of portions of documents.

Hence, there is a need to provide for an efficient and user-friendly method for performing search queries against documents, specifically text documents, providing identical portions, specifically text portions.

SUMMARY

In one embodiment of the invention, a method and a computer readable medium for method for searching documents are provided. Each document is structured into a set of blocks and each block is associated with a block ID. The method includes receiving a search query including a search term having at least one search term attribute; identifying at least one block ID based on a correlation between the at least one search term attribute and the set of blocks; and identifying at least one document based on a correlation between the set of blocks and the documents.

In another embodiment of the invention, a method for generating a data structure for searching documents comprising at least partially identical blocks is provided. In response to receiving a document, blocks are defined within the document and a block ID is allotted to each block. The blocks are indexed and a first data structure containing information about a correlation between a block and a block ID is generated. A second data structure is generated that contains information about the correlation between blocks and documents.

In yet another embodiment, A system for searching a plurality of documents. Each document is structured into a set of blocks, and each block is associated with a block ID. The system includes an input interface, two repositories and a data processing component. The input interface receives a search query comprising a search term having at least one search term attribute. A first repository contains correlations between search term attributes and the set of blocks. A second repository contains correlations between the set of blocks and the documents. The data processing component identifies at least one block ID based on a correlation between the at least one search term attribute and the set of blocks; and identifies at least one document based on a correlation between the set of blocks and the documents.

BRIEF DESCRIPTION OF THE SEVERAL VIEWS OF THE DRAWINGS

In the following, embodiments of the invention will be described in greater detail by way of example, only making reference to the drawings in which.

DETAILED DESCRIPTION

Figure 1:
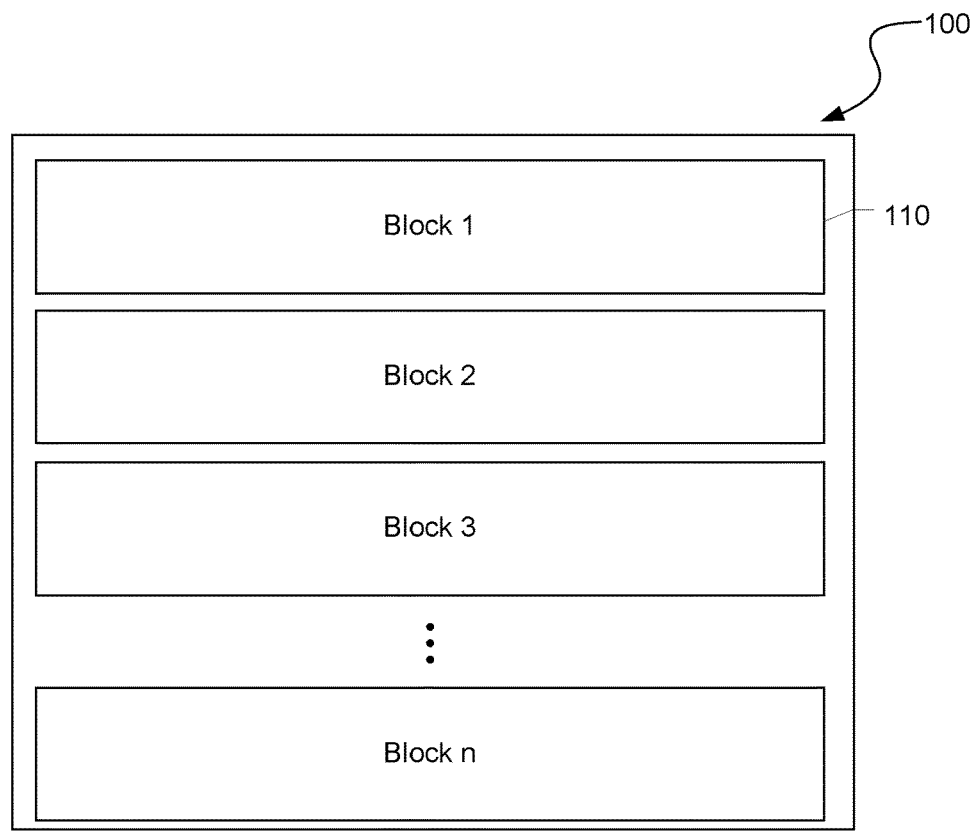
FIG. 1 shows an example schematic representation of a document comprising multiple blocks, in accordance with one embodiment.

As will be appreciated by one skilled in the art, aspects of the present disclosure may be embodied as a system, method or computer program product. Accordingly, aspects of the present disclosure may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present disclosure may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electromagnetic, optical, or any suitable combination thereof. A computer readable signal medium may be any computer readable medium that is not a computer readable storage medium and that can communicate, propagate, or transport a program for use by or in connection with an instruction execution system, apparatus, or device. Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present disclosure are described with reference to flowchart illustrations and/or block diagrams of methods, apparatus (systems) and computer program products according to embodiments of the present disclosure. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The block diagrams in the Figures illustrate the architecture, functionality, and operation of possible implementations of systems, methods and computer program products according to various embodiments of the present disclosure. In this regard, each block in the block diagrams may represent a module, segment, or portion of code, which comprises one or more executable instructions for implementing the specified logical function(s). It should also be noted that, in some alternative implementations, the functions discussed hereinabove may occur out of the disclosed order. For example, two functions taught in succession may, in fact, be executed substantially concurrently, or the functions may sometimes be executed in the reverse order, depending upon the functionality involved. It will also be noted that each block of the block diagrams, and combinations of blocks in the block diagrams, can be implemented by special purpose hardware-based systems that perform the specified functions or acts, or combinations of special purpose hardware and computer instructions.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

Referring to FIG. 1, a schematic diagram of a document 100 is shown. The document may be, for example, a text document. The document may be partitioned in multiple portions. For example, the text document may be an email, which has been replied or forwarded multiple times. The portions of said text document may be single email messages concatenated in the email.

In the following, said portions of a document are referred to as blocks 110. A system, for example an email system or other communication platforms like twitter, weibo etc. may store a plurality of documents 100, wherein subsets of documents 100 comprise blocks 110 with identical content. In addition, blocks may also be attachments of emails or documents within a zip-file attached to an email.

Figure 2:
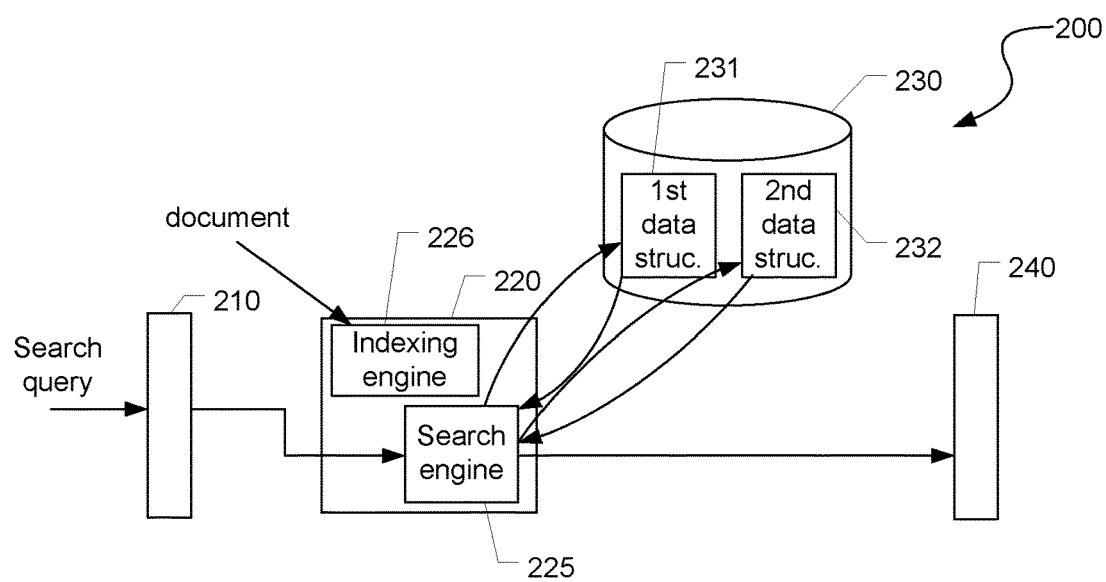
FIG. 2 shows an example schematic representation of a system for performing search queries, in accordance with one embodiment.

FIG. 2 shows a system 200 for performing search queries. The system comprises an input interface 210 for receiving search queries, a data processing component 220 with a search engine 225, a data repository 230 and an output interface 240 for returning search results. A search query received by the input interface 210 may be forwarded to the search engine 225 of the data processing component 220. The data processing component 220, specifically the search engine 225 of the data processing component 220 may be connected to the data repository 230. The data processing component 220 may access a set of data structures stored in the data repository 230. The set of data structures may provide a first data structure 231 and a second data structure 232. The first data structure 231 may be an index providing information regarding correlations between data contained in a block 110, also referred to as block data, and a block ID. The block ID may be a unique attribute correlated with a block ensuring the distinguishability of the blocks. In case of full text indexing, the block data may be single words contained in the block or even groups of words. In other words, the first data structure 231 provides information about which block data are contained in which block or blocks, i.e. the first data structure 231 provides a block-level index.

The second data structure 232 comprises information regarding the associations between blocks 110 and documents 100. The second data structure 232 may provide a table specifying which block is contained in which document. Each block may be indicated by its block ID and each document may be indicated by a unique document name. The second data structure 232 may be a bidirectional look-up-table comprising correlations which blocks are contained in which document and—conversely—which document comprises which blocks.

After receiving the search query comprising a search term comprising at least one search term attribute, e.g. a single word, the search engine 225 may search for the search term attribute within the first data structure 231 resulting in a first query response. The first query response may contain at least one block ID indicating that the search term attribute was included in the block associated with said block ID. Subsequently, a mapping from a block level to document level may be performed by means of the second data structure 232. The search engine 225 may access the second data structure 232 providing the first query response to the second data structure 232 in order to receive a second query response. The first query response may include the block ID that comprises the search term attribute. By means of the second data structure 232 providing correlations between blocks and documents, specifically between block IDs and document names, the at least one document comprising said search term attribute can be obtained. In other words, the second data structure 232 realizes a mapping from a block level to a document level. The document name of the at least one document correlated with the queried block are returned to the search engine 225 as a second query response. Finally said second query response is forwarded to the output interface 240 as a search result.

The system may further comprise an indexing component 226. The indexing component 226 may be part of the data processing component 220 or may be a separate component. The indexing component 226 may receive a document to be indexed. The indexing component 226 may be adapted to identify blocks within the received document. The blocks may be portions of the email body, for example single email threads or single email messages concatenated in one email, documents attached to an email, documents of a ZIP-file attached to the email etc. After defining blocks, a check may be performed in order to ensure if a block with an identical block content has already been indexed before. Said check may be performed for all blocks of the received document. For checking the identity of content, the whole content of a block to be indexed has to be compared with the contents of the already indexed blocks. A hash value of the content of the block to be indexed may be computed and compared with the content hash values of the already indexed blocks. If the content or the hash value of the content is identical, a block with an identical content has already been indexed before and the current block is not indexed. Thereby the computational effort can be reduced.

If no block with identical content has been indexed before, the blocks of the received document are indexed by the indexing component 226. A full text index may be generated defining which block data (e.g. words or phrases) are contained in the respective blocks. The results of said indexing may be stored in the first data structure 231 within the data repository 230. Furthermore, the second data structure 232 may be updated with information regarding which blocks where included in the received document. In other words, the information regarding the mapping between blocks and documents may be updated. Based on the updated first and second data structure, a search query can be run against the new document.

Figure 3:
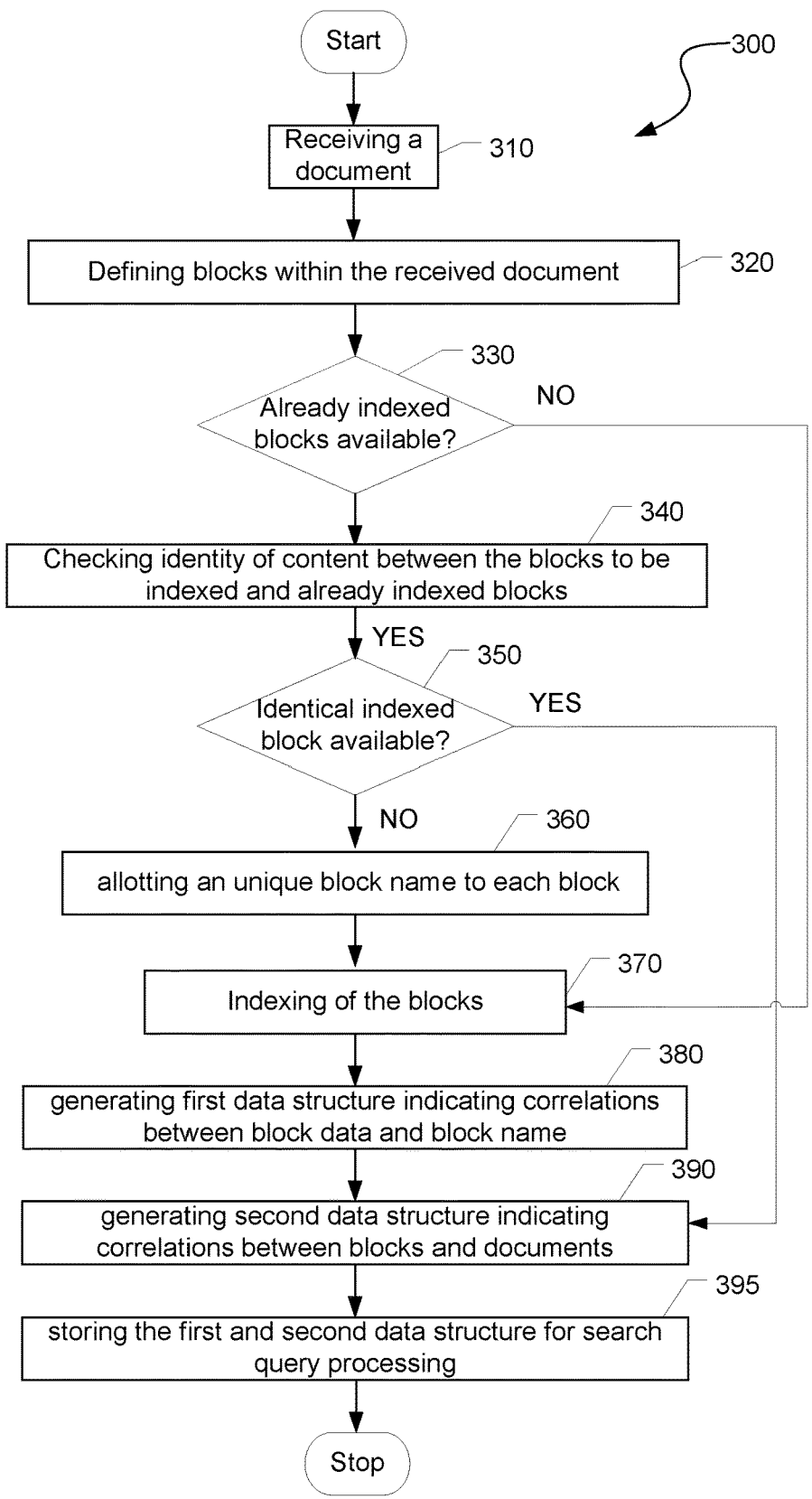
FIG. 3 shows an example schematic flowchart of generating a set of data structures for performing search queries on documents comprising identical blocks, in accordance with one embodiment.

FIG. 3 illustrates the process 300 of generating/updating data structures for searching documents comprising at least partially identical blocks. First of all, a document may be received (Step 310). The document may be parsed in order to identify blocks within the document (Step 320). As already mentioned before, the blocks may be portions of a document, files attached to an email, files within a zip-folder attached to an email etc. Prior to further processing the identified blocks, a checking step 330 may be performed in order to determine, if already indexed blocks are available. If there are no already indexed blocks available, the process may be continued at step 360 described below. If there are already indexed blocks available, each defined block within the received document is checked regarding its identity of content with respect to the already indexed blocks (step 340). In other words, the content of each identified block within the received document is compared with the content of each already indexed blocks. For checking the identity of content, the whole content of the block to be indexed has to be compared with the contents of the already indexed blocks. In order to reduce the computational effort for performing said comparison step, a hash value of the content of the block, in the following also referred to as block identifier, may be computed and compared with the content hash values, i.e. block identifiers of the already indexed blocks. By using said block identifier, it is only necessary to compare the hash value of the new block with their hash values of the previously indexed blocks. If no block with an identical content has been indexed before (step 350), a unique block ID is allotted to said block step 360. The block ID may be identical to the block identifier or may be a separate attribute for identifying the block. As already mentioned before, said step of allotting a block ID is also performed, if no already indexed blocks have been available (step 330).

According to the embodiment of FIG. 3, the blocks are indexed after correlation with a block ID (370). Alternatively, the block may be associated with a block ID after indexing said block. The indexing step may be performed by an indexing engine, such as by a text indexing engine. The indexing engine may be adapted to parse the block and analyze, which block data are available in said block. In other words, the indexing engine is adapted to generate an index of the block data, such as a full-text index of the block. After indexing, the indexing result may be transferred to the first data structure. In case, that the first data structure has not been created before (because it is the first time of indexing a block), said first data structure may be generated. Otherwise, the already existing first data structure may be updated with the data of the actually indexed block (step 380). The first data structure may comprise associations between block data and the blocks comprising said block data. Specifically the first data structure may comprise associations between words or phrases and block IDs or block identifier. So, similar to the table of contents of a book comprising associations between hit words and pages or paragraphs within the book, the first data structure may comprise entries indicating which block data are contained in which block/blocks.

After generating/updating the first data structure, a second data structure may be generated (in case that no second data structure exists) or updated (in case that there is an already existing second data structure) (step 390). The second data structure comprises associations between blocks and documents indicating which blocks are contained in which document/documents. So after identifying, that specific block data (e.g. a word of the search term) are contained in a specific block, the second data structure enables determining a document comprising said block. In other words, by using the second data structure it is possible to map a first query response indicating a block containing at least a part of the search term to a second query response indicating the at least one document comprising said block. In yet other words, the second data structure is an auxiliary data structure enabling a mapping of a block-level query response to document-level query response.

Finally, the first and second data structures are stored in the repository for search query processing. The first and second data structure may be stored in the same repository or in different repositories. Said repositories may be accessible by the data processing component performing the search queries.

Figures 4, 5:
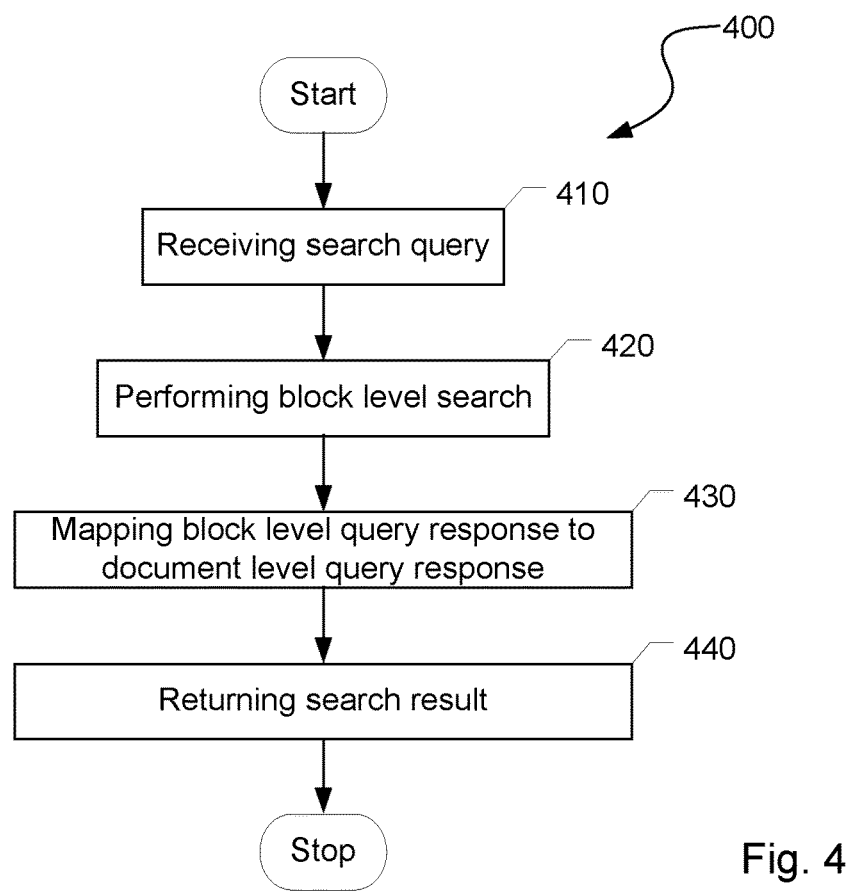
FIG. 4 shows an example schematic flowchart of performing a search query, in accordance with one embodiment.
FIG. 5 shows an example schematic representation of a first data structure, in accordance with one embodiment.

FIG. 4 illustrates the basic structure for performing a search query. The search query may comprise a search term with at least one search term attribute. A search term may only include a single search term attribute or multiple search term attributes concatenated by logical operators. By means of the search query, a plurality of documents should be analyzed in order to determine, if the search term is included in said documents. For example, the search term attribute may be a single word or a phrase. After the starting the process, a search term may be received by the search engine (step 410). Said search query may comprise said search term. A block-level search may be performed which is based on the first data structure (step 420). The search engine may access said first data structure in order to identify which blocks comprise said search term. For example, the first data structure may be a table comprising a plurality of entries. Each entry may be associated with specific block data, for example a word or a phrase. By means of the first data structure said block data may be correlated with information regarding which block/blocks comprise said block data. As a result of accessing the first data structure, the least one block ID or block identifier may be returned, indicating that the block bearing the block ID or block identifier comprises said search term.

After performing the block-level search, the received block-level search result is mapped to a document-level search result by accessing the second data structure (step 430). As already mentioned before, the second data structure comprises associations between blocks and documents indicating which block (identified by its block ID or block identifier) is contained in which document. As a result, at least one document (identified by its document name or document identifier) is returned. Said that least one document may be returned as the final search result (step 440).

FIG. 5 shows an example of the first data structure 500. The first data structure may be organized as a table with rows and columns. For example, the first data structure comprises a first column 510 indicating the block data, specifically words or phrases, a second column 520 indicating the block IDs and a third column containing support information. Said support information may be for example the frequency of the block data within a specific block or the position of said block data within the block. For example, the first row in the list according to FIG. 5 indicates, that the block data "K1" are comprised within the blocks with the block IDs "B2" and "B5". The support information "B2, 1, 1" indicate, that the block data "K1" are included in block "B2" with the frequency "1" (frequency indicator, e.g. once, twice . . . ) and at the position "1" (position indicator).

Figures 6, 7:
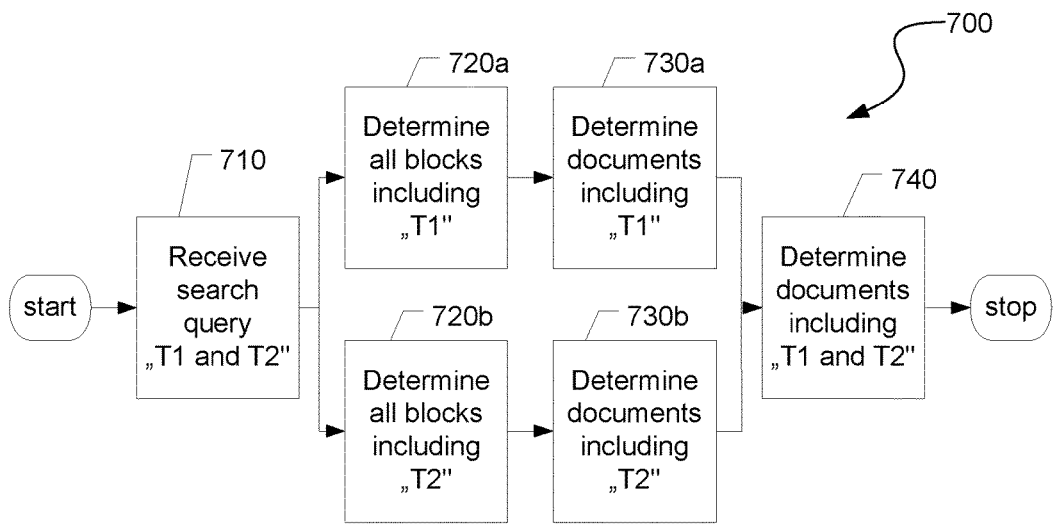
FIG. 6 shows an example schematic representation of a second data structure, in accordance with one embodiment.
FIG. 7 shows a schematic flowchart of a first embodiment of processing an "and"-search query, in accordance with one embodiment.

FIG. 6 shows an example of the second data structure 600. The second data structure 600 is a bi-directional data structure comprising information which block is included in which document and—vice versa—which document includes which blocks. Accordingly, the second data structure is subdivided in two sections 600*a*, 600*b*, wherein a first section 600*a* comprises relationships between specific document IDs and block IDs and the second section 600*b* comprises relationships between specific block IDs and document IDs.

So, the first section 600*a* of the second data structure 600 may be a table comprising a first column 610*a* indicating document IDs, a second column 620*a* indicating the block ID and a third column 630*a* indicating additional support information. Said additional support information may, for example, be block indicators. The block indicators may be block hash values generated by applying hash function on the block content. Said block indicator may be used for comparing block contents in order to determine, if a block with identical block content has been indexed or processed before.

The second section 600*b* may also be a table comprising several columns, wherein the first column 610*b* indicates the block ID, the second column 620*b* indicates the document ID and the search column 630*b* indicates additional support information.

FIG. 7 illustrates the processing 700 of a search query comprising the logical operator "AND". After receiving the search query "T1 and T2" (step 710), wherein T1 and T2 are specific block data, for example words or phrases, the search query is split or fractionized in several sub-terms or search term attributes, i.e. search term attribute T1 and search term attribute T2. For each search term attribute a separate sub-query may be performed. Said sub-queries may be processed consecutively or simultaneously.

In step 720a, all blocks containing the search term attribute "T1" are determined based on the first data structure. Following up, based on the second data structure, the documents are investigated, which comprise the blocks containing the search term attribute "T1" (step 730a). Steps 720a and 730a form the first sub-query.

Similarly, in step 720b, all blocks containing the search term attribute "T2" are determined based on the first data structure. Following up, based on the second data structure, the documents are investigated, which comprise the blocks containing the search term attribute "T2" (step 730b). Steps 720b and 730b form the second sub-query.

In step 740, the results of the first and second sub-query are merged. Steps 730a and 730b return sets of documents. The received two sets of documents are merged by applying the AND-operation on the sets of documents. In other words, the document list resulting from 740 comprises only those documents that are contained in both document lists resulting from the first and second sub-query. Said merged document list may be returned as the search result.

Figure 8:
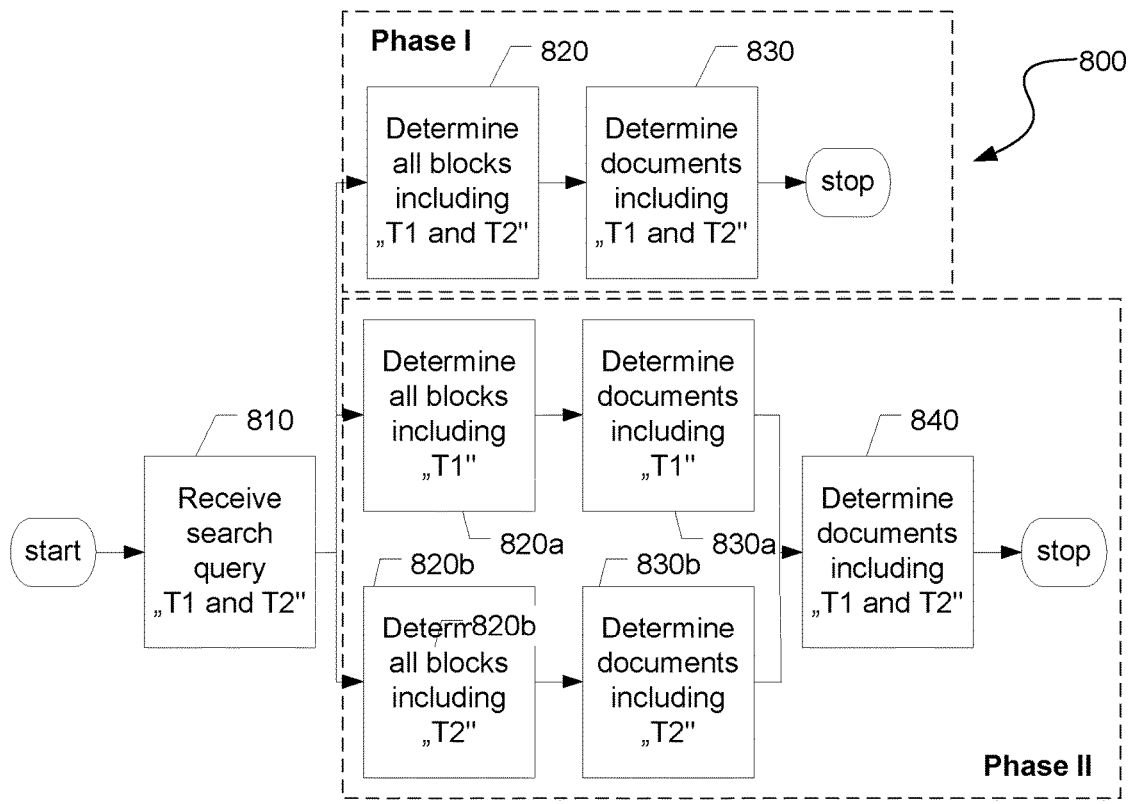
FIG. 8 shows a schematic flowchart of a second embodiment of processing an "and"-search query, in accordance with one embodiment.

FIG. 8 illustrates an alternative processing 800 of a search query comprising the logical operator "AND". After receiving the search query "T1 and T2" (step 810), wherein T1 and T2 are specific block data, for example words or phrases, the process is split into two phases, namely phase I and phase II. Said phases may be performed consecutively (typically phase I first) or simultaneously. In phase I, the search term "T1 and T2" is only performed on a block level, i.e. on all individual blocks, but not performed across all blocks of a specific document (step 820). In other words, each block registered in the second data structure is checked if terms T1 and T2 are comprised in said block. Thereby a set of blocks is obtained which fulfill the condition "T1 and T2". According to step 830, based on the second data structure, the documents that include the blocks of the set of blocks are investigated. So, using the processing according to phase I, only a reduced set of documents fulfilling the search term is obtained, wherein each document contains the search term in at least one block. Documents, which, for example, contain "T1" in a first block and "T2" in a second block, are not found.

The processing of phase II (steps 820a, 820b, 830a, 830b, 840) is identical to the processing of steps 720a, 720b, 730a, 730b, 740 described above. Depending of the required accuracy and speed of the search query, phase I can be processed first in order to obtain a fast search result. Also simultaneous processing of phases I and II is possible wherein the result obtained by phase I is received faster because of the lower processing effort.

Figure 9:
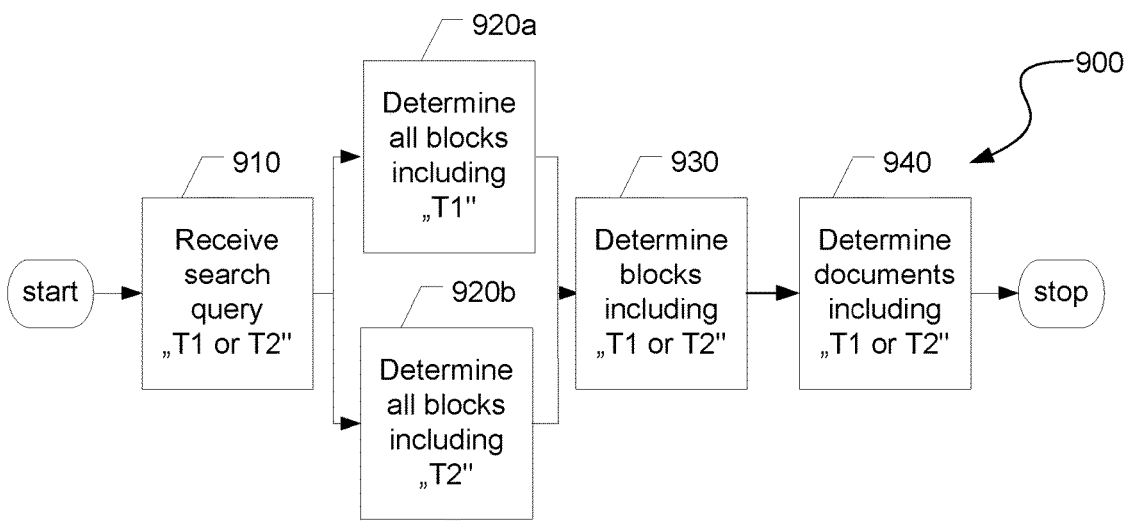
FIG. 9 shows a schematic flowchart of a first embodiment of processing an "or"-search query, in accordance with one embodiment.

FIG. 9 illustrates a first embodiment of the processing 900 of a search query comprising the logical operator "OR". After receiving the search query "T1 or T2" (step 910), the search term is split into two search term attributes "T1", "T2". Following up, each search term attribute is processed individually on the block level, i.e. each block fulfilling "T1", respectively, "T2" is determined (steps 920a, 920b). Thereby two sets of blocks are received, the first set fulfilling search term attribute "T1" and the second set fulfilling search term attribute "T2". After determining the blocks, the first and second set are merged by using the logical operator of the search term, i.e. by using the "or" operator. So, the resulting set includes all blocks that contain "T1 or T2" (step 930). Finally, the set of blocks is transformed in a set of documents using the second data structure. Thereby, a set of documents is received which contain the search term "T1 or T2" (step 940).

Figure 10:
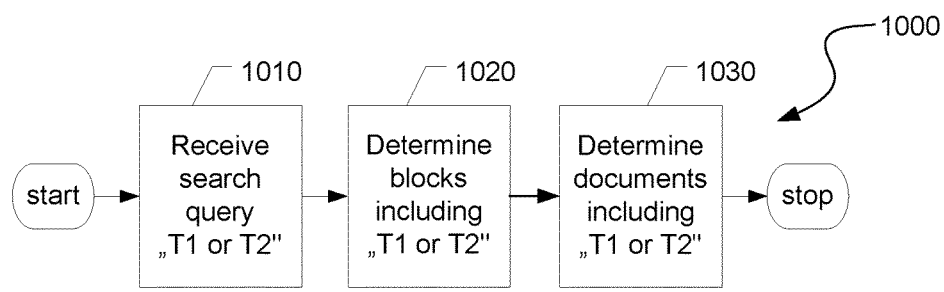
FIG. 10 shows a schematic flowchart of a second embodiment of processing an "or"-search query, in accordance with one embodiment.

FIG. 10 illustrates a second embodiment of the processing 1000 of a search query comprising the logical operator "OR". After receiving the search query "T1 or T2" (step 1010), the search term is not split into several search term attributes but the whole search term is pushed down to the block level, i.e. the whole search term is applied to each block. The processing of at least two search term attributes concatenated by a logical operator totally on the block level is referred to in the following as push-down query. Thereby, a set of blocks is determined which fulfill the search term "T1 or T2" (step 1020). Finally, the set of blocks is transformed in a set of documents using the second data structure. Thereby, a set of documents is received which contain the search term "T1 or T2" (step 1030). Such push-down query is advantageous because of the higher processing performance. As described later on in conjunction with FIG. 15, the push-down query can be also applied to a more complex search term including several "or"-operators.

Figure 11:
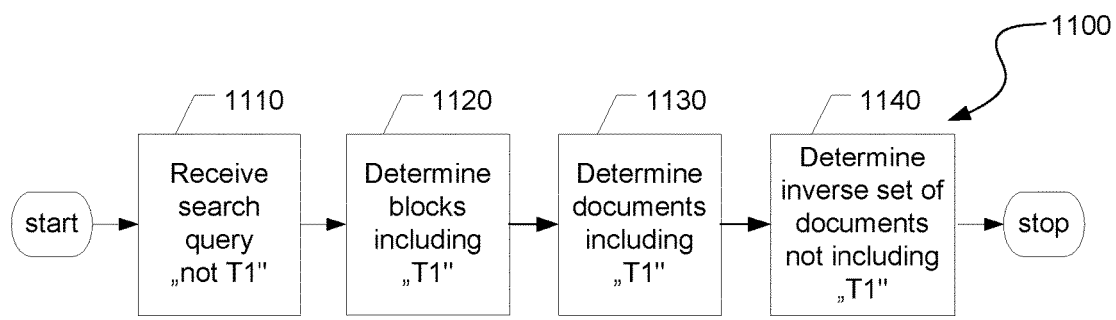
FIG. 11 shows a schematic flowchart of processing a "not"-search query, in accordance with one embodiment.

FIG. 11 illustrates the processing 1100 of a search query comprising the logical operator "NOT". After receiving the search query "NOT T1" (step 1110), all blocks including the term "T1" are determined by means of the first data structure (step 1120). After determining the set of blocks that comprise "T1", the documents correlated with said blocks, i.e. including said blocks are determined (step 1130). The result of step 1130 is an intermediate result including the inverse set of documents to be returned as a response of the search query "not T1". In order to obtain the correct response of the search query "not T1", the set of documents returned as a result of step 1130 has to be inverted (step 1140). In other words, the final result of the search query "not T1" comprises are all documents which are not included within the intermediate result of step 1130. Thereby, a set of documents is received which fulfill the search term "not T1".

Figure 12:
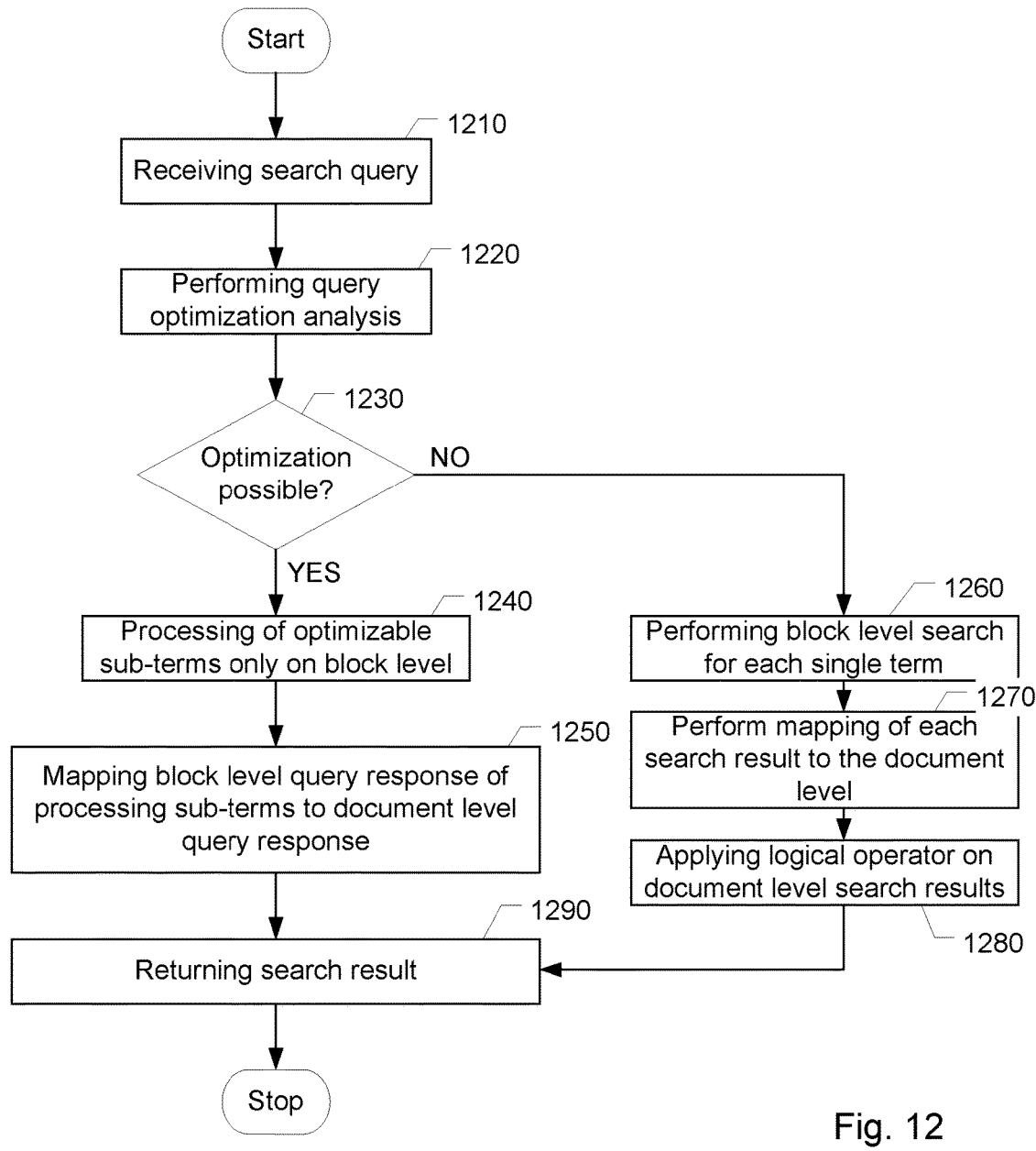
FIG. 12 shows a schematic flowchart of performing a search query with a search optimization step, in accordance with one embodiment.

FIG. 12 illustrates a further, detailed flow chart for search query processing 1200, which optimizes the search query processing 400 shown in FIG. 4. After receiving the search query (step 1210), an optimization analysis is performed in order to enhance the processing speed, respectively, the processing effort of the search query (step 1220). Specifically, if the search term comprises multiple logical operators, sub-terms are investigated which can be handled on a block level without converting the result obtained in the block level into a document-level result. Said sub-terms may, for example, be terms including the or-operator (also multiple concatenated or-terms) or near-by-operators. If an optimization is possible (step 1230), the optimizable sub-terms are processed on a block level without performing an intermediate mapping to the document level (step 1240). After obtaining the result on a block level, the result obtained on the block level is mapped or converted in a search result on the document level (step 1250). In other words, according to step 1240 a block of the search term or sub-term including at least a concatenation of two search term attributes by a logical operator is processed at once on the block level without mapping to the document level, thereby enhancing the processing performance.

If no optimization is possible, each single term within the search term is processed on a block level (step 1260) and mapped to the document level (step 1270). The logical operator concatenating the single search term attributes may be applied on the document level search results (step 1280). Finally, the result of the search query may be returned (step 1290).

Figure 13:
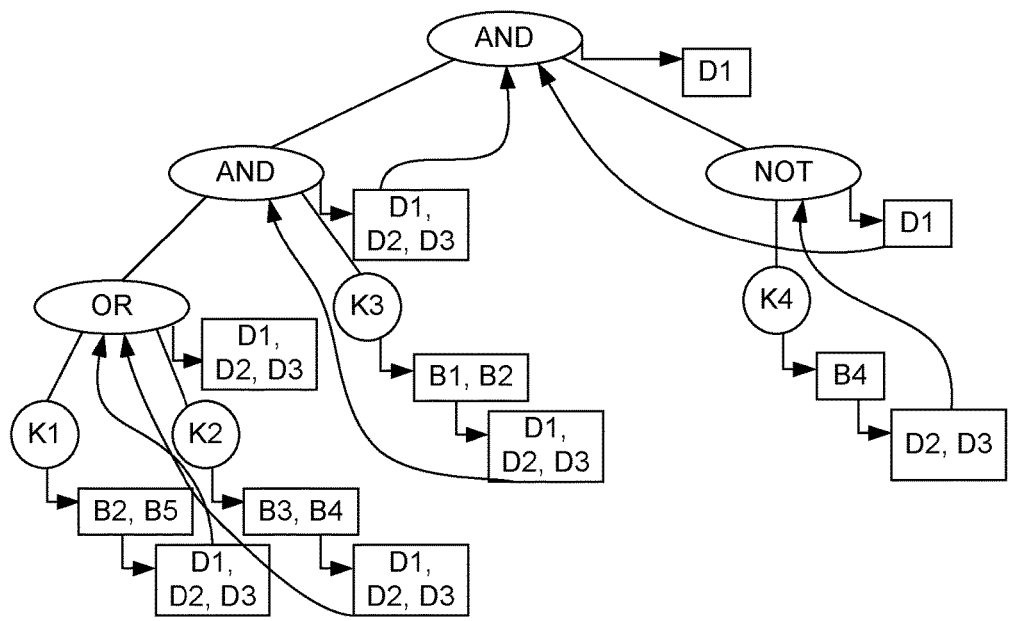
FIG. 13 shows a schematic flowchart of performing a search query without push-down optimization, in accordance with one embodiment.
Figure 14:
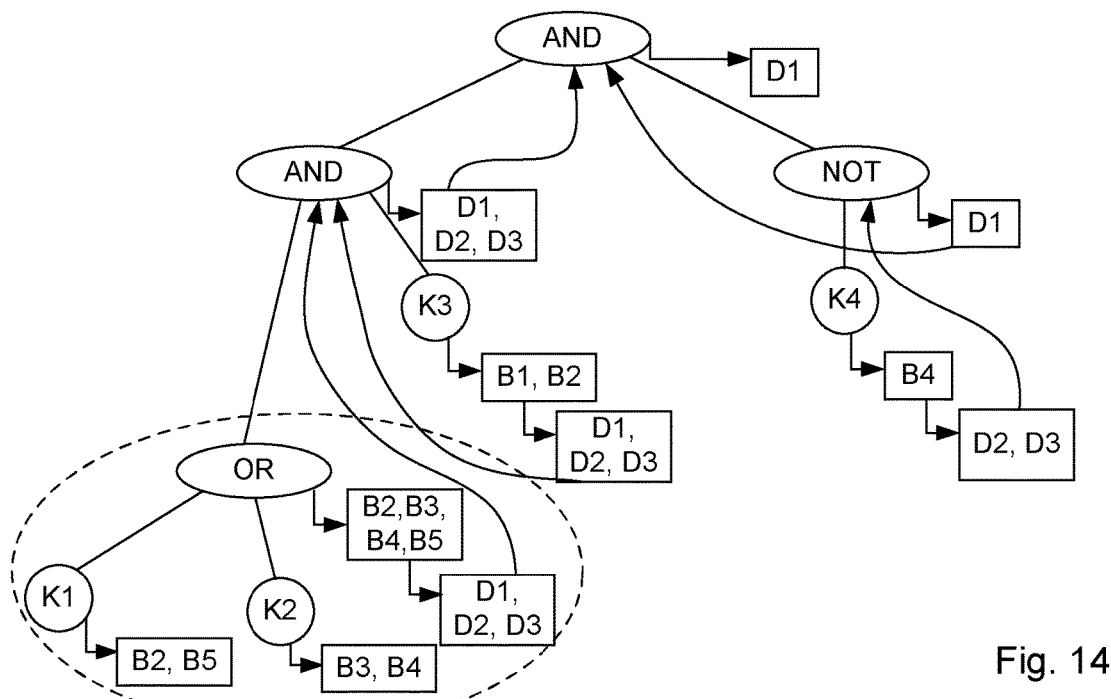
FIG. 14 shows a schematic flowchart of performing a search query with push-down optimization, in accordance with one embodiment.

FIG. 13 and FIG. 14 illustrate the processing of the search term ((K1 or K2) and K3) and (not K4) based on the first data structure shown in FIG. 5 and the second data structure shown in FIG. 6. In FIG. 13 not optimization analysis is performed, whereas FIG. 14 shows the search term processing after performing the optimization step. According to FIG. 13, the blocks are determined which contain search term attributes "K1" and "K2". "K1" is included in blocks B2 and B5, whereas "K2" is included in blocks B3 and B4. After investigating the respective blocks (first query response), the documents containing the respective blocks are determined thereby receiving two sets of documents (D1,D2,D3; D1,D2,D3). Said two sets of documents are combined by using the logical operator "OR", thereby receiving one set of documents as the second query response of the sub-term "K1 or K2". Similarly, the blocks containing the search term attribute "K3" (B1, B2) are determined by means of the first data structure and mapped to a set of documents (D1, D2, D3) using the second data structure. Further on, the obtained sets of documents (D1,D2,D3; D1,D2,D3) are combined by using the "and"-operator. Afterwards, the sub-term "not K4" is processed. The search term attribute "K4" is included in block B4 and the block B4 is comprised in documents D2 and D3. So, the term "not K4" returns a document list containing only document D1. Finally, the "and"-operator is applied on document lists (D1, D2, D3) and (D1) resulting in a query response returning document D1.

In contrast to the processing described in conjunction with FIG. 13, FIG. 14 optimizes the search query processing by determining parts of the search query, which can be directly processed on the block level without mapping to the document level. By performing the optimization step, the sub-term "K1 or K2" may be detected, which can be handled totally on the block level, i.e. the logical "or"-operator can be applied on the resulting block lists obtained by determining blocks containing the search term attributes "K1" and "K2". Thereby, a block list (B2, B3, B4, B5) is obtained, wherein said block list is mapped by the second data structure into a document list (D1, D2, D3). So, comparing the processing of the sub-term "K1 or K2" according to FIGS. 13 and 14, the mapping between the block level and the document level has only to be performed once.

Figure 15:
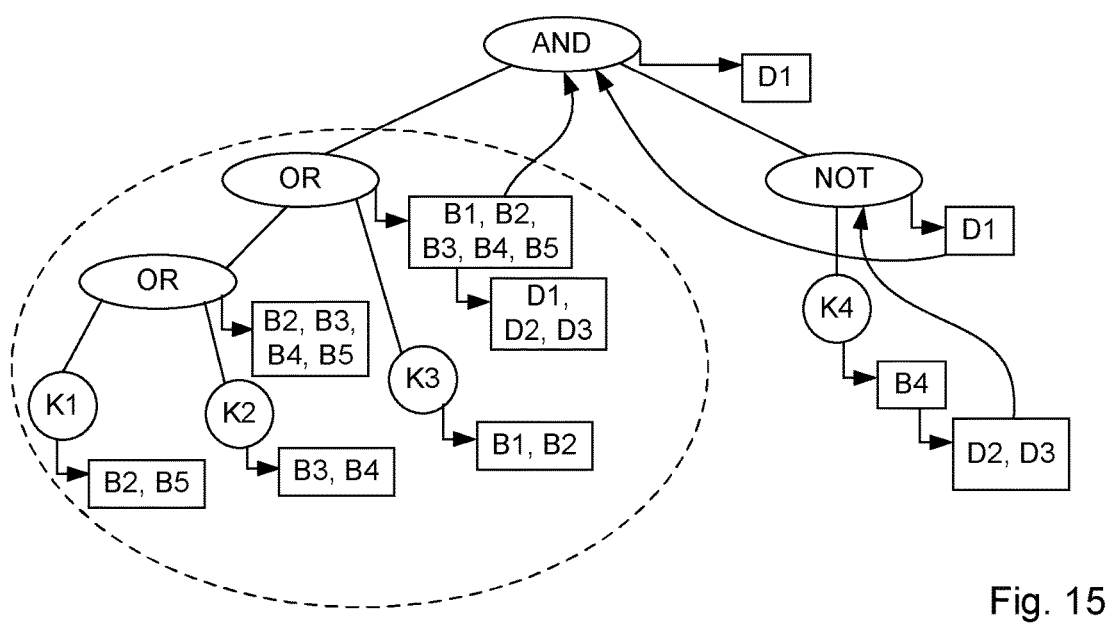
FIG. 15 shows a schematic flowchart of a further example of performing a search query with push-down optimization, in accordance with one embodiment.

FIG. 15 shows the processing of the search term ((K1 or K2) or K3) and (not K4) based on the first data structure shown in FIG. 5 and the second data structure show in FIG. 6. The left branch of the processing tree shown in FIG. 15 comprises two cascaded "or"-operations, which can also be handled by a single push-down query. In other words, the two cascaded "or"-operations are performed totally on the block level leading to a resulting block list (B1, B2, B3, B4, B5), wherein said block list is finally mapped to the document level (D1, D2, D3) for further processing of the search term.

In summary, the following features and advantages can be achieved with the various embodiments of the invention, as detailed above. The first data structure provides a block-level index that comprises correlations between the block data (which are the search term attributes of the search term) included in the block and the block ID. Identical blocks that comprise identical block data are associated with the same block ID. Thereby, the block content is only indexed once leading to a reduced capacity for storing the index. The processing of the search query may be performed in a first step on the block level leading to zero or more block containing the queried search term attribute. The received block may be converted to a document-level search response by determining the documents that contain the blocks investigated in the first step. Thereby, the computational effort for performing search queries on a plurality of documents comprising identical blocks and the storage capacity for storing the index can be reduced.

In some embodiments, the first data structure is an index comprising a plurality of index entries, each index entry being associated with specific block data, which may form the search term attribute within a search term. Thereby, the index may be adapted to store specific data associated with the block data, e.g. block IDs containing said search term attribute as block data, frequency information indicating the frequency of block data within the block or position data indicating the position of the block data within the block.

In some embodiments, each entry of the index comprises information about at least one block ID indicating that the block data (or search term attribute according to the search term wording) associated with the respective index entry are comprised within the block having said block ID. Thereby, the first data structure is searchable regarding search term attributes and the block ID containing said search term attributes can be determined.

In some embodiments, the first data structure comprises additional information for each search term attribute regarding the location of the search term attribute within the block and/or the frequency of occurrence of the search term attribute in a specific block.

In some embodiments, the second data structure is a list providing information about which block is contained in which document and/or which document consists of which blocks. In other words, the second data structure is a supporting data structure containing mapping information between blocks and documents. By means of the second data structure, the block-document associations can be derived. The second data structure can be a bidirectional data structure comprising first data sets defining correlations between blocks and documents and second data sets defining correlations between documents and blocks.

In some, the step of processing the search query comprises an analyzing step, in which the structure of the search query and the logical operators are analyzed and the processing is optimized in order to reduce processing time. The analyzing step may determine at least one sub-term of the search term that can be processed only on the block level, i.e. without mapping the block level result into a document-level result. The analyzing step may be adapted to determine "or"-operators or "nearby"-operators which can be processed directly on the block level.

In some embodiments, the search query consists of a plurality of search term attributes linked by logical operators wherein depending on the logical operators at least a subset of the search query is processed on a block level only using the first data structure. Typically, at least one sub-term comprising an "or"-operator is determined. After determining at least one sub-term, said sub-term is processed on the block level. Specifically, two search term attributes (e.g. concatenated by an "or"-operator) are queried within the first data structure resulting in two sets of blocks, each set being correlated with one search term attribute. Afterwards, the two sets of blocks are merged to a single set of blocks by applying the "or"-operator on said two sets of blocks. Thereby, the sub-term is processed totally on the block level.

In some embodiments, depending on the logical operators within the search query, two search results are generated wherein the first search result contains a reduced number of search hits resulting from search query processing on a block level using the first data structure and the second search result contains the full amount of search hits resulting from a consecutive processing on a block level using the first data structure and on a document level using the second data structure. Said processing may be applied for processing "and"-operations. The first search result may be generated only considering individual blocks, i.e. without any mapping into the document level. Afterwards or simultaneously, the second search result may be generated. Said second search result may include all hits of the search query by determining two sets of blocks by using the first data structure, mapping the sets of blocks into sets of documents by means of the second data structure and merging said two sets of documents by applying the logical operator (typically the "and"-operator) on said two sets of documents. Thereby a quick, first search result can be achieved containing a limited number of search hits including search term attributes that are located close together in the respective blocks. Later on, a second search result containing all search hits is returned.

A set of data structures can be generated which can be used for searching documents on block level and merging the results obtained by the block-level search to a document-level search result. The main advantage of the first data structure is that identical blocks are only indexed once, i.e. the computational effort of indexing documents and the storage for storing the index is reduced.

In some embodiments, before indexing the content of each block to be indexed is compared with contents of already indexed blocks. Typically, the block is only indexed, if no block with an identical content has been indexed before. Thereby, double-indexing of blocks comprising identical content can be avoided.

In some embodiments, for each block a hash value of the block data is generated and stored. Said hash value may be derived by applying a hash function on the whole content of the block. By using the hash value, the comparison of content of a new block to be indexed and already indexed blocks is simplified. Typically, the decision to index a block is made based on the hash value of the actual block to be indexed and the hash values of the previously indexed blocks. If the hash values are identical, also the content of the blocks is identical and no indexing has to be performed. If the hash values are not identical, the block has to be indexed and the first data structure has to be updated.

In some embodiments, the system further comprises an analyzing component adapted to analyze the structure of the search query and the logical operators of the search query in order to optimize processing. Said analyzing component may be adapted to determine at least one sub-term of the search term which can be processed only on the block level, i.e. without mapping the block level result into a document level result. Typically, the analyzer may be adapted to determine "or"-operators or "nearby"-operators which can be processed directly on the block level.

The invention claimed is:

1. A method for searching a plurality of documents, comprising:
receiving a search query comprising at least one search term attribute for a plurality of documents, in which plurality of documents each document is structured into a plurality of blocks, each block comprising a plurality of block data and being associated with a block identifier, wherein blocks comprising identical block data are associated with a same block identifier;
identifying at least one block based on the at least one search term attribute, using a correlation between the plurality of block data and the plurality of blocks;
identifying at least one document based on the identified at least one block, using a correlation between the plurality of blocks and the plurality of documents; and
depending on logical operators within the search query, generating two search results, wherein
a first search result contains a reduced number of search hits resulting from search query processing on a block level, and
a second search result contains the full amount of search hits resulting from a consecutive processing on a block level and on a document level.

2. The method according to claim 1, further comprising: returning the at least one document as a search result.

3. The method according to claim 1, wherein identifying the at least one block comprises:
searching an index comprising a plurality of index entries, each index entry being associated with a specific search term attribute, and each index entry comprising information about at least one block identifier indicating that the corresponding block data includes the search term attribute.

4. The method according claim 1, wherein identifying the at least one block comprises:
searching additional information for each search term attribute regarding one or more of:
the location of the search term attribute within the plurality of block data of the plurality of blocks, and the frequency of occurrence of the search term attribute within the plurality of block data of the plurality of blocks.

5. The method according to claim 1, wherein identifying the at least one document comprises:
searching a list.

6. The method according to claim 1, further comprising: analyzing a structure of the search query; and optimizing processing of the search query.

7. The method according to claim 1, wherein the search query includes a plurality of search term attributes linked by logical operators, wherein at least a subset of the search query is processed on a block level.

8. A non-transitory computer-readable medium comprising computer-readable program code embodied therewith which, when executed by a processor, causes the processor to execute a method for searching a plurality of documents, the method comprising:
receiving a search query comprising at least one search term attribute for a plurality of documents, in which plurality of documents each document is structured into a plurality of blocks, each block comprising a plurality of block data and being associated with a block identifier, wherein blocks comprising identical block data are associated with a same block identifier;
identifying at least one block based on the at least one search term attribute, using a correlation between the plurality of block data and the plurality of blocks;
identifying at least one document based on the identified at least one block, using a correlation between the plurality of blocks and the plurality of documents; and
depending on logical operators within the search query, generating two search results, wherein a first search result contains a reduced number of search hits resulting from search query processing on a block level, and a second search result contains the full amount of search hits resulting from a consecutive processing on a block level and on a document level.

9. The computer-readable medium according to claim 8, wherein the method further comprises:

returning the at least one document as a search result.

10. The computer-readable medium according to claim 8, wherein identifying the at least one block comprises:

searching an index comprising a plurality of index entries, each index entry being associated with a specific search term attribute, and each index entry comprising information about at least one block identifier indicating that the corresponding block data includes the search term attribute.

11. The computer-readable medium according to claim 8, wherein identifying the at least one block comprises:

searching additional information for each search term attribute regarding one or more of:

the location of the search term attribute within the plurality of block data of the plurality of blocks, and the frequency of occurrence of the search term attribute within the plurality of block data of the plurality of blocks.

12. The computer-readable medium according to claim 8, wherein identifying the at least one document comprises:

searching a list.

13. The computer-readable medium according to claim 8, wherein the method further comprises:

analyzing a structure of the search query; and optimizing processing of the search query.

14. The computer-readable medium according to claim 8, wherein the search query includes a plurality of search term attributes linked by logical operators, wherein at least a subset of the search query is processed on a block level.

* * * * *